US009150693B2

(12) United States Patent
Brown et al.

(10) Patent No.: US 9,150,693 B2
(45) Date of Patent: Oct. 6, 2015

(54) PREPARATION OF SULFONATED NAPHTHALENE POLYOXADIAZOLES POLYMERS

(71) Applicant: E I DU PONT DE NEMOURS AND COMPANY, Wilmington, DE (US)

(72) Inventors: Peter A Brown, Wilmington, DE (US); Justin W. Chan, Wilmington, DE (US); Michael W Cobb, Wilmington, DE (US); Sharlene Renee Williams, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 56 days.

(21) Appl. No.: 13/915,690

(22) Filed: Jun. 12, 2013

(65) Prior Publication Data
US 2013/0338335 A1 Dec. 19, 2013

Related U.S. Application Data

(60) Provisional application No. 61/660,101, filed on Jun. 15, 2012.

(51) Int. Cl.
C08G 63/02 (2006.01)
C08G 73/08 (2006.01)

(52) U.S. Cl.
CPC .................................... C08G 73/08 (2013.01)

(58) Field of Classification Search
CPC ....................................................... C08G 73/08
USPC ............ 528/272; 264/184; 521/128, 180, 183
See application file for complete search history.

(56) References Cited

U.S. PATENT DOCUMENTS

| 3,063,966 A | 11/1962 | Kwolek et al. |
| 3,193,602 A | 7/1965 | Leonard et al. |
| 3,227,793 A | 1/1966 | Cipriani |
| 3,414,645 A | 12/1968 | Morgan, Jr. |
| 3,642,708 A * | 2/1972 | Sekiguchi et al. ............. 525/419 |
| 3,748,302 A | 7/1973 | Jones |
| 3,767,756 A | 10/1973 | Blades |
| 3,775,382 A * | 11/1973 | Brydon .......................... 528/336 |
| 3,869,429 A | 3/1975 | Blades |
| 3,869,430 A | 3/1975 | Blades |
| 3,886,251 A | 5/1975 | Sekiguchi et al. |
| 4,046,731 A | 9/1977 | Mortimer et al. |
| 4,075,269 A | 2/1978 | Jones, Jr. et al. |
| 4,115,503 A * | 9/1978 | Bach ............................. 264/184 |
| 4,177,347 A | 12/1979 | Meyer |
| 4,202,962 A | 5/1980 | Bach |
| 4,500,701 A | 2/1985 | Stephens |
| 4,533,693 A | 8/1985 | Wolfe et al. |
| 4,703,103 A | 10/1987 | Wolfe et al. |
| 4,772,678 A | 9/1988 | Sybert et al. |
| 4,847,350 A | 7/1989 | Harris |
| 4,898,924 A | 2/1990 | Chenevey et al. |
| 4,939,235 A | 7/1990 | Harvey et al. |
| 4,963,428 A | 10/1990 | Harvey et al. |
| 5,089,591 A | 2/1992 | Gregory et al. |
| 5,208,105 A | 5/1993 | Ichibori et al. |
| 5,276,128 A | 1/1994 | Rosenberg et al. |
| 5,336,734 A | 8/1994 | Bowen et al. |
| 5,367,042 A | 11/1994 | Pierini et al. |
| 5,506,042 A | 4/1996 | Ichibori et al. |
| 5,667,743 A | 9/1997 | Tai et al. |
| 5,674,969 A | 10/1997 | Sikkema et al. |
| 7,211,203 B2 | 5/2007 | Otsuki et al. |
| 7,528,216 B2 | 5/2009 | Lee et al. |
| 7,528,217 B2 | 5/2009 | Lee et al. |
| 7,582,721 B2 | 9/2009 | Lee et al. |
| 2007/0255037 A1* | 11/2007 | Lee et al. ....................... 528/293 |
| 2008/0085992 A1 | 4/2008 | Lee et al. |
| 2008/0193652 A1 | 8/2008 | De Figueiredo Gomes et al. |
| 2008/0318109 A1 | 12/2008 | de Figueiredo Gomes et al. |
| 2009/0203870 A1 | 8/2009 | de Figueiredo Gomes et al. |

FOREIGN PATENT DOCUMENTS

| CN | 1472200 A | 2/2004 |
| CN | 101735455 B | 7/2012 |
| DE | 292919 A5 | 8/1991 |
| GB | 1252508 | 11/1971 |
| GB | 1339324 | 12/1973 |
| GB | 1527352 | 11/1978 |
| WO | 0077283 A2 | 12/2000 |

OTHER PUBLICATIONS

Gomes, Dominique et al., Synthesis and Characterization of Poly(arylene ether oxadiazole) Telechelics, Macromolecular Chemistry and Physics, 2003, pp. 2130-2141, vol. 204.
Gomes, Dominique et al., Characterization of partially sulfonated polyoxadiazoles and oxadiazole-triazole copolymers, Journal of Membrane Science, 2007, pp. 121-129, vol. 295.
Imai, Yoshio, Direct Fiber Formation and Fiber Properties of Aromatic Polyoxadiazoles, Journal of Applied Polymer Science, 1970, pp. 225-239, vol. 14.
Iwakura, Yoshio et al., Poly-1,3,4-oxadiazoles. I. Polyphenylene-1,3,4-oxadiazoles, Journal of Polymer Science: Part A, 1965, pp. 45-54, vol. 3.
Vetter, S. et al., Synthesis and characterization of new sulfonated poly(arylene ether 1,3,4-oxadiazole)s, Reactive & Functional Polymers, 2004, pp. 171-182, vol. 61.
PCT Application No. PCT/US2013/45084, filed Jun. 11, 2013.
PCT Application No. PCT/US2013/45064, filed Jun. 11, 2003.
PCT Application No. PCT/US2013/45127, filed Jun. 11, 2003.

* cited by examiner

Primary Examiner — Gregory Listvoyb

(57) ABSTRACT

Described is the preparation of sulfonated polyoxadiazole polymers with a high degree of sulfonation and good flammability properties. The polymers are useful in articles such as fibers.

6 Claims, No Drawings

PREPARATION OF SULFONATED NAPHTHALENE POLYOXADIAZOLES POLYMERS

This application claims the benefit of priority of U.S. Provisional Application No. 61/660,101 filed on Jun. 15, 2012, the entirety of which is herein incorporated by reference.

FIELD OF THE INVENTION

The invention is directed to methods of preparing sulfonated naphthalene polyoxadiazole polymers.

BACKGROUND

Workers that can be exposed to flames, high temperatures, and/or electrical arcs and the like, need protective clothing and articles made from thermally resistant fabrics. Any increase in the effectiveness of these protective articles, or any increase in the comfort, durability, and dyeability of these articles while maintaining protection performance, is welcomed.

Polyoxadiazole polymers have unique properties and are useful in many fields, for example high performance fibers, such as flame retardant fibers. One method to improve flammability is to prepare sulfonated polyoxadiazole polymers. These methods have included the use of sulfonated monomers and post-sulfonation. Gomes et al. (US 20098/0318109, US2008/0193652, US2009/0203870) reacted hydrazine sulfate and aromatic dicarboxylic acids in phosphoric acid to form monosulfonated polyoxadiazole copolymers, and subsequently post-sulfonated the polymer. Another method is the use of oleum during polymerization to sulfonate the polymer as it is prepared. Lee et al. (U.S. Pat. No. 7,528,216 and U.S. Pat. No. 7,582,721) prepared random polyoxadiazole copolymers by reacting aromatic dicarboxylic acids with hydrazine sulfate in a limited amount of oleum, and prepared sulfonated random polyoxadiazole copolymers using sulfonated monomers (U.S. Pat. No. 7,528,217).

There is a need for an easy method to prepare polyoxadiazole polymers with a high degree of sulfonation that produce polymers with improved properties, such as flame retardancy, UV stability, and dyeability.

SUMMARY

One aspect of the invention is a process for preparing a polymer, comprising the steps of:

a) combining hydrazine, oleum, 2,6-naphthalene dicarboxylic acid and one or both of terephthalic acid and isophthalic acid, to form a reaction mixture, wherein the oleum is added in an amount of at least about 4 molar equivalents of $SO_3$ based on the number of moles of hydrazine; and b) heating the reaction mixture to a temperature of about 100° C. to about 180° C. until a polymer is prepared.

DETAILED DESCRIPTION

Disclosed is a polymer comprising repeat units of Formula (I) and one or both of Formula (II) and (IIa):

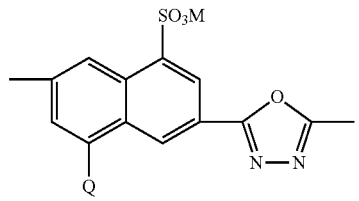

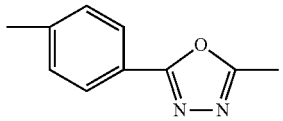

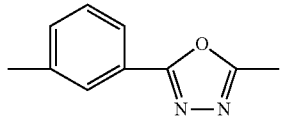

wherein Q is H or $SO_3M$ and M is a cation.

M is typically a monovalent cation such as H, Li, Na, K, or $NH_4$. Formula (I) is present at about 1 molar % to less than about 100 molar %, or about 5 molar % to about 50 molar %, or about 5 molar % to about 35 molar %, and one or both of Formula (II) and (IIa) is present at greater than about 0 molar % to about 95 molar %, or about 50 molar % to about 95 molar %, or about 65 molar % to about 95 molar %. In another embodiment Formula (II) is used in about 60 to about 95 molar %, or about 70 to about 90 molar %; and Formula (IIa) is used in greater than about 0 to about 30 molar %, or greater than about 0 to about 20 molar %. In another embodiment, Formula (II) is not present or Formula (IIa) is not present.

Q can be either H or $SO_3M$, or a mixture. When Q is a mixture, typically Q is $SO_3M$ in about 50% up to about 99% of the repeat units; more typically about 70% to about 95% or about 85 to about 95%. In one embodiment, Q is $SO_3M$ in more than about 90% of the repeat units.

M can be converted to another M at any time, either before or after spinning or formation into a shaped article. When M is H, the polymer can be neutralized by contact with a salt, such as but not limited to sodium bicarbonate, sodium hydroxide, cesium hydroxide, lithium hydroxide, potassium hydroxide, or potassium carbonate. The ion exchange and/or neutralization can be performed by any method known in the art.

The polymer can further comprise repeat units of other moieties in the polymer chain. These repeat units can comprise one or both of Formula (III) and Formula (IIIa):

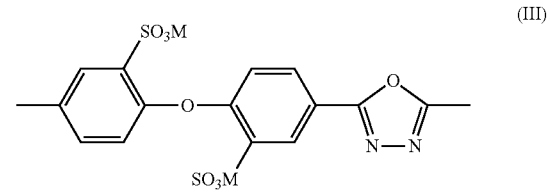

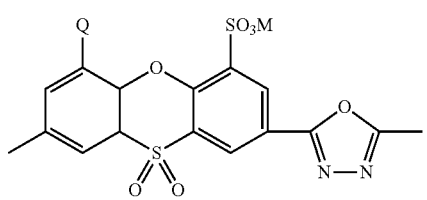

wherein Q is H or SO$_3$M; and M is one or more cations.

This embodiment is characterized by its ring-closed structure. In one embodiment, Formula (I) is present at about 5 molar % to about 50 molar %, or about 5 molar % to about 40 molar %, or about 10 molar % to about 30 molar %, and one or both of Formula (II) and (IIa) is present at about 50 molar % to about 95 molar %, or about 60 molar % to about 95 molar %, or about 70 molar % to about 90 molar %, and one or both of Formula (III) and Formula (IIIa) is present at about 1 molar % to about 50 molar % or about 5 molar % to about 30 molar %, or about 5 molar % to about 20 molar %. In another embodiment, Formula (IIIa) is present at less than about 5%. In another embodiment, Formula (II) is not present or Formula (IIa) is not present.

The polymers disclosed can have at least about 2 weight %, 4 weight %, or 6 weight % sulfur content. The amount of sulfur can be increased by sulfonation of the monomers before polymerization, or sulfonation of the polymer.

The polymers disclosed herein can be made by any method or process known in the art. One suitable method comprises the steps of:
a. combining hydrazine, oleum, 2,6-naphthalene dicarboxylic acid (NDA), optionally 4,4'-oxybis(benzoic acid) (OBBA), and one or both of terephthalic acid and isophthalic acid, to form a reaction mixture, wherein the oleum is added in an amount of at least about 5 molar equivalents of SO$_3$ based on the number of moles of hydrazine; and
b. heating the reaction mixture to a temperature of about 100° C. to about 180° C. until a sulfonated copolyoxadiazole polymer is prepared.

Other monomers may also be present in the reaction mixture.

The process described herein can prepare sulfonated polyoxadiazole copolymers that comprise at least about 2 weight %, 4 weight %, or 6 weight % sulfur content. The amount of sulfur can be increased by additional process steps in which the NDA and/or the OBBA, or one or both of terephthalic acid and isophthalic acid are further sulfonated before polymerization, and/or process steps in which the polyoxadiazole copolymer product is sulfonated. This sulfonation can be performed by any method known in the art that is not detrimental to the final product, such as contact with oleum, sulfuric acid, or other sulfonation agent.

Hydrazine can be used directly, or used in the form of a solid hydrazine salt. One suitable solid salt is hydrazine sulfate, [N$_2$H$_5$]$^+$HSO$_4^-$, also called hydrazinium sulfate.

Oleum, also known as fuming sulfuric acid, disulfuric acid or pyrosulfuric acid, refers to a solution of various compositions of sulfur trioxide (SO$_3$) in sulfuric acid. Typically about 15% or 18%, to about 30%, or about 22% oleum is used, which refers to the weight % of SO$_3$ in the sulfuric acid. The oleum is added in an amount of at least about 4 molar equivalents of SO$_3$, or at least about 5 molar equivalents, based on the number of moles of hydrazine.

The amounts of the reagents used is dependent on the desired percentage of the repeat units in the final polymer. Based on the total amount of dicarboxylic acids used, 2,6-naphthalene dicarboxylic acid is used in amounts of at about 1 molar % to less than about 100 molar %, or about 5 molar % to about 50 molar %, or about 5 molar % to about 30 molar %, and one or both of terephthalic acid and isophthalic acid is used in amounts of about 1 molar % or less than about 100 molar %, or about 50 molar % to about 99 molar %, or about 70 molar % to about 95 molar %. In another embodiment OBBA is present at about 1 molar % to about 30 molar %, or about 2 molar % to about 20 molar %. In another embodiment terephthalic acid is used in about 50 to about 95 molar %, or about 80 to about 90 molar %; and isophthalic acid is used in about 0 to about 30 molar %, or about 0 to about 20 molar %. In another embodiment, terephthalic acid is not present or isophthalic acid is not present. Various ratios of hydrazine can be could be used, but is typically used at about a 1:1 molar ratio of dicarboxylic acids:hydrazine.

The ingredients can be combined in any order, but typically the solid ingredients are first thoroughly mixed together and then combined with the oleum. In one embodiment, the oleum is added in a single step; that is, added in one aliquot. In another embodiment, the oleum and NDA and optionally OBBA can be mixed together prior to the addition of the other dicarboxylic acids and hydrazine. The mixture is then thoroughly mixed by stirring or other agitation means until sufficiently dissolved, typically at least five minutes. This dissolution can be performed at room temperature up to about 100° C.

In one embodiment, the process comprises the steps of:
1) combining hydrazine or salt thereof, NDA and optionally OBBA, and one or both of terephthalic acid and isophthalic acid to form a pre-mixture;
2) stirring the pre-mixture for at least 5 minutes; and
3) adding oleum to the pre-mixture in an amount of at least about 4 molar equivalents of SO$_3$ based on the number of moles of hydrazine to form a reaction mixture.

After dissolution, the mixture is allowed to react until sufficient polymer has formed. Typically the polymerization reaction is performed at a temperature of about 100° C. to about 180° C., or about 120° C. to about 140° C., for at least about 0.5 hours. The temperature can be maintained or increased or ramped up during the reaction. The temperature can be used to control the amounts of sulfonation and type of sulfonated repeating units in the final polymer. For instance, if more sulfonation and/or ring-closed repeating units are desired then the temperature should be increased, typically to greater than about 120° C. If less sulfonation and/or ring-closed repeating units are desired then the temperature should be lower, typically less than about 100° C.

Also disclosed is a sulfonated copolyoxadiazole polymer prepared by the process described herein, and shaped articles and fibers made therefrom.

The polymers described herein can be formed into a shaped article, such as films, fibrids, fibers for floc, and fibers for textile uses. It can be spun into fibers via solution spinning, using a solution of the polymer in either the polymerization solvent or another solvent for the polymer. Fiber spinning can be accomplished through a multi-hole spinneret by dry spinning, wet spinning, or dry-jet wet spinning (also known as air-gap spinning) to create a multi-filament yarn or tow as is known in the art.

Shaped articles as described herein include extruded or blown shapes or films, molded articles, and the like. Films can be made by any known technique such as casting the dope onto a flat surface, extruding the dope through an extruder to form a film or extruding and blowing the dope film to form an extruded blown film. Typical techniques for dope film extrusion include processes similar to those used for fibers, where the solution passes through a spinneret or die into an air gap and subsequently into a coagulant bath. More details describing the extrusion and orientation of a dope film can be found in Pierini et al. (U.S. Pat. No. 5,367,042); Chenevey, (U.S. Pat. No. 4,898,924); Harvey et al., (U.S. Pat. No. 4,939,235); and Harvey et al., (U.S. Pat. No. 4,963,428). Typically the dope film prepared is preferably no more than about 250 mils (6.35 mm) thick and more preferably it is at most about 100 mils (2.54 mm) thick.

"Fiber" is defined as a relatively flexible, unit of matter having a high ratio of length to width across its cross-sectional area perpendicular to its length. Herein, the term "fiber" is used interchangeably with the term "filament" or "end" or "continuous filament". The cross section of the filaments described herein can be any shape, such as circular or bean shaped, but is typically generally round, and is typically substantially solid and not hollow. Fiber spun onto a bobbin in a package is referred to as continuous fiber. Fiber can be cut into short lengths called staple fiber. Fiber can be cut into even smaller lengths called floc. Yarns, multifilament yarns or tows comprise a plurality of fibers. Yarn can be intertwined and/or twisted.

"Floc" is defined as fibers having a length of 2 to 25 millimeters, preferably 3 to 7 millimeters and a diameter of 3 to 20 micrometers, preferably 5 to 14 micrometers. If the floc length is less than 3 millimeters, paper strength made from the floc is severely reduced, and if the floc length is more than 25 millimeters, it is difficult to form a uniform paper web by a typical wet-laid method. If the floc diameter is less than 5 micrometers, it can be difficult to commercially produce with adequate uniformity and reproducibility, and if the floc diameter is more than 20 micrometers, it is difficult to form uniform paper of light to medium basis weights. Floc is generally made by cutting continuous spun filaments into specific-length pieces.

The term "fibrids" as used herein, means a very finely-divided polymer product of small, filmy, essentially two-dimensional, particles known having a length and width on the order of 100 to 1000 micrometers and a thickness only on the order of 0.1 to 1 micrometer. Fibrids are made by streaming a polymer solution into a coagulating bath of liquid that is immiscible with the solvent of the solution. The stream of polymer solution is subjected to strenuous shearing forces and turbulence as the polymer is coagulated.

Fibrids and floc prepared from the polymers described herein can be used to form a paper, especially a thermally stable paper or paper that can accept ink or color more readily than other high performance papers. As employed herein the term paper is employed in its normal meaning and it can be prepared using conventional paper-making processes and equipment and processes. The fibrous material, i.e. fibrids and floc can be slurried together to from a mix which is converted to paper such as on a Fourdrinier machine or by hand on a handsheet mold containing a forming screen. Reference may be made to Gross U.S. Pat. No. 3,756,908 and Hesler et al. U.S. Pat. No. 5,026,456 for processes of forming fibers into papers. If desired, once the paper is formed it is calendered between two heated calendering rolls with the high temperature and pressure from the rolls increasing the bond strength of the paper. Calendering also provides the paper with a smooth surface for printing. Several plies with the same or different compositions can be combined together into the final paper structure during forming and/or calendering. In one embodiment, the paper has a weight ratio of fibrids to floc in the paper composition of from 95:5 to 10:90. In one preferred embodiment, the paper has a weight ratio of fibrids to floc in the paper composition of from 60:40 to 10:90.

The paper is useful as printable material for high temperature tags, labels, and security papers. The paper can also be used as a component in materials such as printed wiring boards; or where dielectric properties are useful, such as electrical insulating material for use in motors, transformers and other power equipment. In these applications, the paper can be used by itself or in laminate structures either with or without impregnating resins, as desired. In another embodiment, the paper is used as an electrical insulative wrapping for wires and conductors. The wire or conductor can be totally wrapped, such a spiral overlapping wrapping of the wire or conductor, or can wrap only a part or one or more sides of the conductor as in the case of square conductors. The amount of wrapping is dictated by the application and if desired multiple layers of the paper can be used in the wrapping. In another embodiment, the paper can also be used as a component in structural materials such as core structures or honeycombs. For example, one or more layers of the paper may be used as the primarily material for forming the cells of a honeycomb structure. Alternatively, one or more layers of the paper may be used in the sheets for covering or facing the honeycomb cells or other core materials. Preferably, these papers and/or structures are impregnated with a resin such as a phenolic, epoxy, polyimide or other resin. However, in some instances the paper may be useful without any resin impregnation.

Fibers may be spun from solution using any number of processes, however, wet spinning and air-gap spinning are the best known. In wet spinning, the spinneret extrudes the fiber directly into the liquid of a coagulation bath and typically the spinneret is immersed or positioned beneath the surface of the coagulation bath. In air-gap spinning (also sometimes known as "dry-jet" wet spinning) the spinneret extrudes the fiber first into a gas, such as air, for a very short duration and then the fiber is immediately introduced into a liquid coagulation bath. Typically the spinneret is positioned above the surface of the coagulation bath, creating an "air-gap" between the spinneret face and the surface of the coagulation bath. The general arrangement of the spinnerets and baths is well known in the art, with the figures in U.S. Pat. Nos. 3,227,793; 3,414,645; 3,767,756; and 5,667,743 being illustrative of such spinning processes for high strength polymers.

"Dry spinning" means a process for making a filament by extruding a solution into a heated chamber having a gaseous atmosphere to remove the solvent, leaving a solid filament. The solution comprises a fiber-forming polymer in a solvent which is extruded in a continuous stream through one or more spinneret holes to orient the polymer molecules. This is distinct from "wet spinning" or "air-gap spinning" wherein the polymer solution is extruded into a liquid precipitating or coagulating medium to regenerate the polymer filaments. In other words, in dry spinning a gas is the primary solvent extraction medium, and in wet spinning a liquid is the primary solvent extraction medium. In dry spinning, after formation of solid filaments, the filaments can then be treated with a liquid to either cool the filaments or wash the filaments to further extract remaining solvent.

The fibers in the multi-filament yarn, or tow, after spinning can then be treated to neutralize, wash, dry, or heat treat the fibers as needed using conventional technique to make stable and useful fibers. The fibers formed from the polymers described herein are useful in a variety of applications. They are colorless, or colorless to white in color, although impurities can impart discoloration, and are particularly useful as flame retardant fibers as the polymers have a limiting oxygen index of about 24 or greater, or about 26 or greater, or about 28 or greater, or about 30 or greater.

In one embodiment, the fibers can be spun from sulfuric acid solutions ranging in concentration from 3 to 25 wt % polymer using a spinneret with 5-50 holes having diameter of 0.003" or 0.008". The volumetric flow rate of spinning solution is typically 0.3-2 mL/min. The fiber is then extruded directly into a coagulation bath filled with a room temperature or elevated temperature or sub-ambient temperature solution containing 0-70 wt. % sulfuric acid, saturated salt solutions, or basic aqueous solutions.

The number, size, shape, and configuration of the orifices can be varied to achieve the desired fiber product. The extruded dope is fed into a coagulation bath with or without prior passage through a noncoagulating fluid layer. The noncoagulating fluid layer is generally air but can be any other inert gas or liquid which is a noncoagulant for the dope.

The fibers and/or film can contain common additives such as dyes, pigments, antioxidants, delusterants, antistatic agents, and U.V. stabilizers, added either to the spin solution, dope or to the coagulation bath, or coated on the fiber during or after the spinning process. The fibers would exhibit good dyeability, especially cationic dyes.

Basic or cationic dyes are water soluble and dissociate into anions and colored cations. The cations have a strong affinity for the sulfonic group in the polymer masterbatch, and forms salts.

The sulfonated polyoxadiazole copolymers prepared by the process disclosed above can be neutralized either before or after formation into a shaped article, so that the H cation is replaced by another cation, typically a monovalent cation such as Li, Na, K, or $NH_4$. This is performed by contacting the sulfonated polyoxadiazole copolymer with a neutralization agent, typically a basic salt such as sodium bicarbonate or other ion exchange agent.

As used herein, the term "staple fibers" refers to fibers that are cut to a desired length or are stretch broken, or fibers that occur naturally with or are made having a low ratio of length to the width of the cross-sectional area perpendicular to that length when compared with filaments. Man-made staple fibers are cut or made to a length suitable for processing on cotton, woolen, or worsted yarn spinning equipment. The staple fibers can have (a) substantially uniform length, (b) variable or random length, or (c) subsets of the staple fibers have substantially uniform length and the staple fibers in the other subsets have different lengths, with the staple fibers in the subsets mixed together forming a substantially uniform distribution.

In some embodiments, suitable staple fibers have a length of about 0.25 centimeters (0.1 inches) to about 30 centimeters (12 inches). In some embodiments, the length of a staple fiber is from about 1 cm (0.39 in) to about 20 cm (8 in). In some preferred embodiments the staple fibers made by short staple processes have a staple fiber length of about 1 cm (0.39 in) to about 6 cm (2.4 in).

The staple fibers can be made by any process. For example, the staple fibers can be cut from continuous straight fibers using a rotary cutter or a guillotine cutter resulting in straight (i.e., non crimped) staple fiber, or additionally cut from crimped continuous fibers having a saw tooth shaped crimp along the length of the staple fiber, with a crimp (or repeating bend) frequency of preferably no more than 8 crimps per centimeter.

The staple fibers can also be formed by stretch breaking continuous fibers resulting in staple fibers with deformed sections that act as crimps. Stretch broken staple fibers can be made by breaking a tow or a bundle of continuous filaments during a stretch break operation having one or more break zones that are a prescribed distance creating a random variable mass of fibers having an average cut length controlled by break zone adjustment.

Spun staple yarn can be made from staple fibers using traditional long and short staple ring spinning processes that are well known in the art. For short staple, cotton system spinning fiber lengths from about 1.9 to 5.7 cm (0.75 in to 2.25 in) are typically used. For long staple, worsted or woolen system spinning, fibers up to about 16.5 cm (6.5 in) are typically used. However, this is not intended to be limiting to ring spinning because the yarns may also be spun using air jet spinning, open end spinning, and many other types of spinning which converts staple fiber into useable yarns.

Spun staple yarns can also be made directly by stretch breaking using stretch-broken tow to top staple processes. The staple fibers in the yarns formed by traditional stretch break processes typically have length of up to about 18 cm (7 in) long. However spun staple yarns made by stretch breaking can also have staple fibers having maximum lengths of up to around 50 cm (20 in.) through processes as described for example in PCT Patent Application No. WO 0077283. Stretch broken staple fibers normally do not require crimp because the stretch-breaking process imparts a degree of crimp into the fiber.

The staple fibers can also be formed by stretch breaking continuous fibers resulting in staple fibers with deformed sections that act as crimps. Stretch broken staple fibers can be made by breaking a tow or a bundle of continuous filaments during a stretch break operation having one or more break zones that are a prescribed distance creating a random variable mass of fibers having an average cut length controlled by break zone adjustment.

The term continuous filament refers to a flexible fiber having relatively small-diameter and whose length is longer than those indicated for staple fibers. Continuous filament fibers and multifilament yarns of continuous filaments can be made by processes well known to those skilled in the art.

Many different fibers can be used as the textile staple fiber. In some embodiments aramid fiber can be used in the blend as the textile staple fiber. In some preferred embodiments meta-aramid fibers are used in the blend as the textile staple fiber. By aramid is meant a polyamide wherein at least 85% of the amide (—CONH—) linkages are attached directly to two aromatic rings. A meta-aramid is such a polyamide that contains a meta configuration or meta-oriented linkages in the polymer chain. Meta-aramid fibers are currently available under the trademarks Nomex® from E. I. du Pont de Nemours of Wilmington, Del. Additives can be used with the aramid and, in fact it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. In some embodiments, the preferred meta-aramid fiber is poly(meta-phenylene isophthalamide (MPD-I). This fiber may be spun by dry or wet spinning using any number of processes; U.S. Pat. Nos. 3,063,966 and 5,667,743 are illustrative of useful processes.

In some embodiments para-aramid fibers can be used as the textile staple fiber in the blend for increased flame strength and reduced thermal shrinkage. Para-aramid fibers are currently available under the trademarks Kevlar® from E. I. du Pont de Nemours of Wilmington, Del. and Twaron® from Teijin Ltd. of Tokyo, Japan. For the purposes herein, Technora® fiber, which is available from Teijin Ltd. of Tokyo, Japan, and is made from copoly(p-phenylene/3,4'diphenyl ester terephthalamide), is considered a para-aramid fiber.

In some embodiments polyazole fibers can be used as the textile fiber in the blend. For example, suitable polyazoles include polybenzazoles, polypyridazoles, and the like, and can be homopolymers or copolymers. Additives can be used with the polyazoles and up to as much as 10 percent, by weight, of other polymeric material can be blended with the polyazoles. Also copolymers can be used having as much as 10 percent or more of other monomer substituted for a monomer of the polyazoles. Suitable polyazole homopolymers and copolymers can be made by known procedures, such as those described in U.S. Pat. No. 4,533,693 (to Wolfe, et al., on Aug. 6, 1985), U.S. Pat. No. 4,703,103 (to Wolfe, et al., on Oct. 27, 1987), U.S. Pat. No. 5,089,591 (to Gregory, et al., on Feb. 18, 1992), U.S. Pat. No. 4,772,678 (Sybert, et al., on Sep. 20, 1988), U.S. Pat. No. 4,847,350 (to Harris, et al., on Aug. 11, 1992), and U.S. Pat. No. 5,276,128 (to Rosenberg, et al., on Jan. 4, 1994).

In some embodiments the preferred polybenzazoles are polybenzimidazoles, polybenxothiazoles, and polybenzoxazoles. If the polybenzazole is a polybenzimidazole, preferably it is poly[5,5'-bi-1H-benzimidazole]-2,2'-diyl-1,3-phenylene which is called PBI. If the polybenzazole is a polybenxothiazole, preferably it is a polybenxobisthiazole and more preferably it is poly(benxo[1,2-d:4,5-d']bisthiazole-2,6-diyl-1,4-phene which is called PBT. If the polybenzazole is a polybenzoxazole, preferably it is a polybenzobisoxazole and more preferably it is poly(benzo[1,2-d:4,5-d']bisoxazole-2,6-diyl-1,4-phenylene which is called PBO. In some embodiments the preferred polypyridazoles are rigid rod polypyridobisazoles including poly(pyridobisimidazole), poly(pyridobisthiazole), and poly(pyridobisoxazole). The preferred poly(pyridobisoxazole) is poly(1,4-(2,5-dihydroxy)phenylene-2,6-pyrido[2,3-d:5,6-d']bisimidazole which is called PIPD. Suitable polypyridobisazoles can be made by known procedures, such as those described in U.S. Pat. No. 5,674,969.

In some embodiments modacrylic fibers can be used. The preferred modacrylic fibers used in this invention are copolymers of acrylonitrile combined with vinylidene chloride. The copolymer can have, in addition, an antimony oxide or antimony oxides for improved fire retardancy. Such useful modacrylic fibers include, but are not limited to, fibers disclosed in U.S. Pat. No. 3,193,602 having 2 weight percent antimony trioxide, fibers disclosed in U.S. Pat. No. 3,748,302 made with various antimony oxides that are present in an amount of at least 2 weight percent and preferably not greater than 8 weight percent, and fibers disclosed in U.S. Pat. Nos. 5,208,105 & 5,506,042 having 8 to 40 weight percent of an antimony compound. The preferred modacrylic fiber is commercially available from Kaneka Corporation, Japan, in various forms, some containing no antimony oxides while others such as Protex C are said to contain 10 to 15 weight percent of those compounds.

In some preferred embodiments the various types of staple fibers are present as a staple fiber blend. By fiber blend it is meant the combination of two or more staple fiber types in any manner. Preferably the staple fiber blend is an "intimate blend", meaning the various staple fibers in the blend form a relatively uniform mixture of the fibers. In some embodiments the two or more staple fiber types are blended prior to or while the yarn is being spun so that the various staple fibers are distributed homogeneously in the staple yarn bundle.

Fabrics can be made from the spun staple yarns and can include, but is not limited to, woven or knitted fabrics. General fabric designs and constructions are well known to those skilled in the art. By "woven" fabric is meant a fabric usually formed on a loom by interlacing warp or lengthwise yarns and filling or crosswise yarns with each other to generate any fabric weave, such as plain weave, crowfoot weave, basket weave, satin weave, twill weave, and the like. Plain and twill weaves are believed to be the most common weaves used in the trade and are preferred in many embodiments.

By "knitted" fabric is meant a fabric usually formed by interlooping yarn loops by the use of needles. In many instances, to make a knitted fabric spun staple yarn is fed to a knitting machine which converts the yarn to fabric. If desired, multiple ends or yarns can be supplied to the knitting machine either plied of unplied; that is, a bundle of yarns or a bundle of plied yarns can be co-fed to the knitting machine and knitted into a fabric, or directly into an article of apparel such as a glove, using conventional techniques. In some embodiments it is desirable to add functionality to the knitted fabric by co-feeding one or more other staple or continuous filament yarns with one or more spun staple yarns having the intimate blend of fibers. The tightness of the knit can be adjusted to meet any specific need. A very effective combination of properties for protective apparel has been found in for example, single jersey knit and terry knit patterns.

In some particularly useful embodiments, the spun staple yarns can be used to make flame-resistant garments. In some embodiments the garments can have essentially one layer of the protective fabric made from the spun staple yarn. Exemplary garments of this type include jumpsuits and coveralls for fire fighters or for military personnel. Such suits are typically used over the firefighters clothing and can be used to parachute into an area to fight a forest fire. Other garments can include pants, shirts, gloves, sleeves and the like that can be worn in situations such as chemical processing industries or industrial electrical/utility where an extreme thermal event might occur. In some preferred embodiments the fabrics have an arc resistance of at least 0.8 calories per square centimeter per ounce per square yard.

In one embodiment the fiber mixture of the polymeric staple fiber and the textile staple fiber is formed by making an intimate blend of the fibers. If desired, other staple fibers can be combined in this relatively uniform mixture of staple fibers. The blending can be achieved by any number of ways known in the art, including processes that creel a number of bobbins of continuous filaments and concurrently cut the two or more types of filaments to form a blend of cut staple fibers; or processes that involve opening bales of different staple fibers and then opening and blending the various fibers in openers, blenders, and cards; or processes that form slivers of various staple fibers which are then further processed to form a mixture, such as in a card to form a sliver of a mixture of fibers. Other processes of making an intimate fiber blend are possible as long as the various types of different fibers are relatively uniformly distributed throughout the blend. If yarns are formed from the blend, the yarns have a relatively uniform mixture of the staple fibers also. Generally, in most preferred embodiments the individual staple fibers are opened or separated to a degree that is normal in fiber processing to make a useful fabric, such that fiber knots or slubs and other major defects due to poor opening of the staple fibers are not present in an amount that detract from the final fabric quality.

In a preferred process, the intimate staple fiber blend is made by first mixing together staple fibers obtained from opened bales, along with any other staple fibers, if desired for additional functionality. The fiber blend is then formed into a sliver using a carding machine. A carding machine is commonly used in the fiber industry to separate, align, and deliver fibers into a continuous strand of loosely assembled fibers without substantial twist, commonly known as carded sliver. The carded sliver is processed into drawn sliver, typically by, but not limited to, a two-step drawing process.

Spun staple yarns are then formed from the drawn sliver using techniques including conventional cotton system or short-staple spinning processes such as open-end spinning and ring-spinning; or higher speed air spinning techniques such as Murata air-jet spinning where air is used to twist the staple fibers into a yarn. The formation of spun yarns can also be achieved by use of conventional woolen system or long-staple processes such as worsted or semi-worsted ring-spinning or stretch-break spinning. Regardless of the processing system, ring-spinning is the generally preferred method for making the spun staple yarns.

EXAMPLES

Unless otherwise stated, the examples were all prepared using the following procedures. Ratios of reagents are given as mole ratios. Oleum, was obtained from E. I. du Pont de Nemours and Company, Wilmington, Del. Terephthalic acid (TA), isophthalic acid (IA), 4,4'-oxybis(benzoic acid) (OBBA), 2,6-naphthalene dicarboxylic acid (NDA), methane sulfonic acid, polyphosphoric acid, and $d_6$-dimethylsulfoxide were obtained from Sigma-Aldrich®. Hydrazine sulfate was obtained from Acros Organics. Sulfuric acid and sodium bicarbonate were obtained from EMD Chemicals, Inc. 2,6-Naphthalene dicarboxylic acid (NDA) was obtained from Novolyte Technologies, General Polymerization Procedure Unless otherwise specified, the following general polymerization procedure was used in each example while varying the ratio of the monomers, as specified. To a dried 100 mL glass reactor equipped with a glass mechanical stirrer, nitrogen inlet, and reagent addition ports are added solid hydrazine sulfate (0.015 mol, 1 molar equivalent) and the dicarboxylic acid(s) in amounts that total 1 molar equivalent. The molar ratios of dicarboxylic acids:hydrazine sulfate were 1:1, unless otherwise specified. The specific molar ratios of each dicarboxylic acid are specified in the examples. The solid ingredients were blended together thoroughly for 15 minutes under nitrogen. Unless otherwise specified, to this blended mixture of solids is added 28.5 g of 18.7% oleum (fuming sulfuric acid, 18.7% by weight free $SO_3$ content) (4.4 molar ratio) at room temperature while stirring. The reaction kettle is completely sealed and leak-free (including stirrer shaft) to prevent vapor phase ingredients from escaping the kettle. The mixture is mechanically stirred (250 RPM) at room temperature for several minutes. The mixture will then be heated to 130° C. over a ~30 minute period. The typical polymerization was allowed to proceed for 4 hours at 130° C. During the polymerization, the stir rate was often reduced or stopped if the viscosity of the polymerization solution became too high.

In some examples, pre-reacted NDA is used. 2,6-NDA was dissolved in 18.7% oleum, and the reaction was allowed to proceed for 6.5 hours at 130° C. The reactor was charged with hydrazine sulfate and the other dicarboxylic acids, in the same ratios as above. The mixture of sulfonated 2,6-NDA was then added. The mixture contained a lot of solid chunks which did not incorporate into the reaction mixture. The polymerization was allowed to proceed for 4 hours at 130° C.

General Fiber Formation Procedure

Two methods were used to prepare fibers.

The polymer reaction mixture was diluted with sulfuric acid (95-98%). Sufficient sulfuric acid was added so that the solution viscosity was high enough such that a thin continuous stream could be dropped into a blender containing water while rotating at a rate, to ensure that the coagulated fiber not be pulled apart. Optimization of this process was determined for each polymerization. In order to coagulate fiber, a rubber septum was added to the top of the blender blade, which allowed for the fiber to be wound around and collected. The fiber was then rewound onto a glass vial, typically by hand, washed with water, and then soaked in dilute sodium bicarbonate until fully neutralized. The fiber was then washed and soaked with water to remove any residual sodium bicarbonate. The fibers were allowed to dry at ambient conditions. In some examples, a sample of the fiber was dried under high vacuum at room temperature for molecular weight determination by size exclusion chromatography (SEC) in methane sulfonic acid.

The fibers were spun from sulfuric acid solutions that ranged in concentration from 6-9 wt % polymer. The solution was delivered by a gear pump through a spinneret with 5-20 holes having diameter of 0.003" or 0.008". The volumetric flow rate of spinning solution was 0.2-2 mL/min. The fiber was extruded directly into a coagulation bath filled with a room temperature solution that was 0-70 wt. % sulfuric acid. The fiber emerged from the coagulation bath through a ceramic guide into a wash bath of room temperature water. In the wash bath the fiber was wrapped around two speed-controlled driven rolls and then drawn 50-600%. Three wraps were usually made around each of these rolls. The fiber was wound onto a phenolic core. The wound fiber bobbins were then neutralized in 0.5 wt % sodium bicarbonate or sodium hydroxide solution, washed in de-ionized water and air dried at room temperature in a series of batch steps.

General Cast Film Preparation Procedure

The polymerization solution was diluted with sulfuric acid (95-98%) until the viscosity achieved would allow pouring onto a glass plate to give a uniform film. This viscosity was typically less than the viscosity required to coagulate fiber. The polymer and glass plate were immersed into a water bath in order to coagulate the film. The coagulated film was washed with water and then soaked in dilute sodium bicarbonate until fully neutralized. The film was then washed and soaked with water to remove any residual sodium bicarbonate. The film was pressed under varying amounts of pressure between paper towels, repeatedly, until mostly dry by touch. The film was then placed between aluminum foil sheets and pressed at 10,000 lb for 5 minutes. The resulting film was dried under high vacuum at room temperature for 24 hours.

LOI Measurement

Limiting Oxygen Index (LOI) is the minimum concentration of oxygen, expressed as a volume percent, in a mixture of oxygen and nitrogen that will just support the flaming combustion of a material initially at room temperature under the conditions of ASTM G125/D2863. LOI was measured using a modified ASTM method (ASTM D 2863) to allow for rapid screening of the samples. Films were mounted in sample holder which was inserted in the LOI apparatus and covered with a glass chimney. The oxygen content within the glass chimney was controlled digitally. The film was exposed to a flame, and the oxygen level in the chimney was increased until the sample burns. The LOI of any given sample was measured at the point at which candle-like burning can be sustained.

Examples 1-23

| EX | TA | NDA | OBBA | Mn | Mw | Mw/Mn | LOI | Oleum Conc. | Notes |
|---|---|---|---|---|---|---|---|---|---|
| 1 | 80 | 10 | 10 | 31800 | 52800 | 1.66 | 32 | 18.7% | Aldrich NDA |
| 2 | 80 | 10 | 10 | 30700 | 56200 | 1.83 | 32 | 18.7% | Aldrich NDA |
| 3 | 90 | 10 | 0 | 30900 | 61500 | 1.99 | <27 | 18.7% | Aldrich NDA |
| 4 | 85 | 15 | 0 | 32500 | 56900 | 1.75 | 27 | 18.7% | Aldrich NDA |
| 5 | 90 | 5 | 5 | 32700 | 60800 | 1.86 | 27 | 18.7% | Aldrich NDA |
| 6 | 80 | 20 | 0 | 31000 | 54600 | 1.76 | 29 | 18.7% | Aldrich NDA |
| 7 | 70 | 30 | 0 | 21900 | 45300 | 2.07 | 33 | 18.7% | Aldrich NDA |
| 8 | 84 | 16 | 0 | — | — | — | 26.5 | 22% | Aldrich NDA |
| 9 | 83 | 17 | 0 | — | — | — | 26.5 | 22% | Aldrich NDA |
| 10 | 82 | 18 | 0 | — | — | — | 29 | 22% | Aldrich NDA |
| 11 | 81 | 19 | 0 | — | — | — | 28 | 22% | Aldrich NDA |
| 12 | 85 | 15 | 0 | 28300 | 56800 | 2.01 | 25.5 | 22% | Aldrich NDA |
| 13 | 80 | 20 | 0 | — | — | — | 28 | 22% | Novolyte NDA |
| 14 | 79 | 21 | 0 | — | — | — | 29 | 22% | Novolyte NDA |
| (1) 15 | 75 | 25 | 0 | 14946 | 44537 | 2.98 | 25 | — | Novolyte NDA PPA/P$_2$O$_5$ |
| 16 | 81.5 | 18.5 | 0 | 28895 | 55094 | 1.91 | 27.5 | 22% | Novolyte NDA |
| (2) 17 | 81.5 | 18.5 | 0 | 32027 | 62591 | 1.95 | 27.5 | 22% | Novolyte NDA |
| (3) 18 | 81.5 | 18.5 | 0 | 23653 | 47218 | 2 | 27.5 | 22% | Novolyte NDA |
| (4) 19 | 81.5 | 18.5 | 0 | 23530 | 40585 | 1.72 | 27.5 | 22% | Novolyte NDA |
| 20 | 80 | 20 | 0 | 23398 | 48472 | 2.07 | — | 22% | Novolyte NDA |
| 21 | 80 | 20 | 0 | 24501 | 44644 | 1.82 | — | 22% | Novolyte NDA |
| (5) 22 | 85 | 15 | 0 | — | — | — | — | 18.7% | No change in viscosity, monomers not completely soluble |
| (6) 23 | 80 | 10 | 10 (IA) | 22900 | 53400 | 2.34 | 25.5 | 30% | |

(1) Comparative example. Oleum was replaced by polyphosphoric acid and sulfuric acid was replaced by phosphoric acid
(2) Comparative example. Reaction temperature was increased to 140° C. instead of 130° C. as described in the general procedure. All other specifications are the same.
(3) Comparative example. Reaction temperature was increased to 150° C. instead of 130° C. as described in the general procedure. All other specifications are the same.
(4) Comparative example. Reaction temperature was increased to 160° C. instead of 130° C. as described in the general procedure. All other specifications are the same.
(5) Pre-reacted (sulfonated) 2,6-NDA was used.
(6) Isophthalic acid: IA. 5 molar equivalents of oleum used.

Example 24

Proof of Sulfonation of 2,6-naphthalene dicarboxylic Acid 2,6-Naphthalene dicarboxylic acid (0.5053 g, Aldrich 99%) was added to 27.9 g of 18.7% oleum. The material was heated to 130° C. and reacted with stirring by magnetic bar for 30 minutes. The reaction was removed from heat and allowed to cool to room temperature. $^1$H NMR spectrum and LC/MS were performed and indicate that the desired sulfonated products were formed. A saturated solution of the monosulfonated sulfone product was prepared in water-d$_2$ containing a trace of sodium 3-trimethylsilylpropionate-d$_4$ as a chemical shift referent. The solution was inserted in a NMR probe. Literature comparison permitted assignment of the $^1$H resonances of the primary disulfonated product. The $^1$H assignments (in ppm relative to chemical shift referent at 0.00 ppm) are shown in the following below.

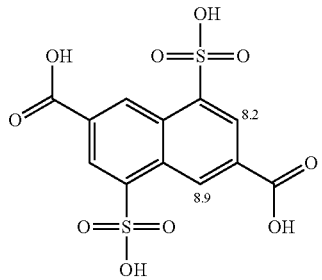 [SMILES: O=C(O)c1cc(S(=O)(=O)O)c2cc(C(=O)O)cc(S(=O)(=O)O)c2c1]

Elemental Analysis was performed on a sample prepared from Example 12 and found 55.56% C, 2.95% H, 14.88% N, 17.71% O, and 2.21% S. The full results are shown below:

| | % C | % H | % N | % O | % S |
|---|---|---|---|---|---|
| POD-NDA (85:15) | 55.56 | 2.95 | 14.88 | 17.71 | 2.21 |
| POD-NDA (85:15 assuming disulfonation & 93% elemental recovery) | 51.84 | 2.75 | 13.88 | 16.53 | 2.06 |
| POD-NDA (85:15 assuming monosulfonation & 93% elemental recovery) | 48.37 | 2.57 | 12.96 | 15.42 | 1.92 |

Example 25

Fiber Formation

Fibers were made from the polymer of Example 1 using the following procedure. The fibers were spun from sulfuric acid solutions with a concentration of 7.2 wt % (15 mol % NDA) POD co-polymer. The solution was delivered by a gear pump through a spinneret with 10 holes having diameter of 0.005". The volumetric flow rate of spinning solution was 1.8 mL/min. The fiber was extruded directly into a coagulation bath filled with a room temperature solution that was 56 wt. % sulfuric acid. The fiber emerged from the coagulation bath through a ceramic guide into a wash bath of room temperature solution of NaOH in water maintained at a pH ~12.0. In the wash bath the fiber was wrapped around two speed-controlled driven rolls and then drawn 400%. Three wraps were usually made around each roll. The fiber was wound onto a phenolic core. The wound fiber bobbins were then washed in de-ionized water and air dried at room temperature in a series of batch steps.

Fibers were made from the polymer of Example 2 using the following procedure. The fibers were spun from sulfuric acid solutions with a concentration of 7.8 wt % (20 mol % NDA) POD co-polymer. The solution was delivered by a gear pump through a spinneret with 20 holes having diameter of 0.005". The volumetric flow rate of spinning solution was 1.8 mL/min. The fiber was extruded directly into a coagulation bath filled with a room temperature solution that was 58 wt. % sulfuric acid. The fiber emerged from the coagulation bath through a ceramic guide into a wash bath of room temperature solution of NaOH in water maintained at a pH ~12.0. In the wash bath the fiber was wrapped around two speed-controlled driven rolls and then drawn 340%. Three wraps were usually made around each roll. The fiber was wound onto a phenolic core. The wound fiber bobbins were then washed in de-ionized water and air dried at room temperature in a series of batch steps.

Dye Test Using Carrier

The method below was used to separately test the following dyes:

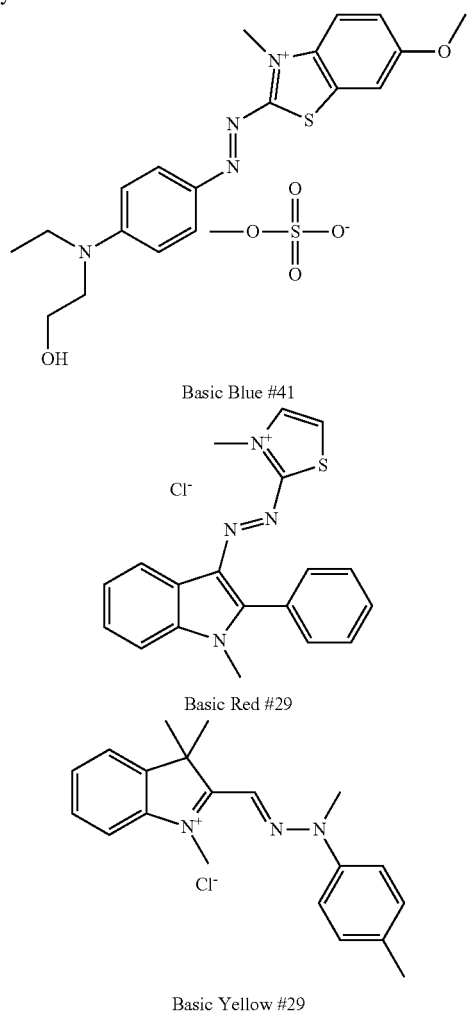

Basic Blue #41

Basic Red #29

Basic Yellow #29

In a 250-ml round bottom flask equipped with a reflux condenser was added POD-NDA yarn (30-50 mg) and a solution of MERPOL® HCS (1 drop of 0.1 wt % solution, ~0.03 g), benzyl alcohol (1.65 g), and de-ionized water (53.39 g). The mixture was heated on a 46° C. aluminum round bottom heating block for 15 minutes. Next, a solution of basic dye (0.003-0.005 g), benzyl alcohol (0.301 g), and de-ionized water (9.80 g) was added to the flask. The mixture was heated for 10 minutes at 46° C. before adding acetic acid (1 drop of 0.85 wt %). The mixture was further heated to 70° C. for 15 minutes, and then to 100-130° C. for 60 minutes, it took ~5-10 minutes to increase the heat. Next, the solution was removed leaving the fiber behind in the flask. The fiber was then washed with hot de-ionized water (~70° C.), and again with room temperature de-ionized water. To the flask was added a solution of MERPOL® HCS (0.061 g of a 0.1 wt % solution) and de-ionized water (50 g); then the flask was heated at 70° C. for 20 minutes. The fiber was then washed with hot de-ionized water (~70° C.) and room temperature de-ionized water sequentially. The fiber was wrapped in a Sontara® SPS™ towel to dry. Fibers were analyzed by cross-section. Images indicate distribution of each dye to the core of the fiber. (Fibers dyed at lower concentration of dye showed dye penetration to the core, but the absence of dye around the sheath; fibers dyed at higher concentrations of dye showed uniform dye penetration.)

Dye Test without Using Carrier

In a 250-ml round bottom flask equipped with a reflux condenser was added POD-NDA yarn (30-50 mg) and a solution of MERPOL® HCS (1 drop of 0.1 wt % solution, ~0.03 g), benzyl alcohol (1.65 g), and de-ionized water (53.39 g). The mixture was heated on a 46° C. aluminum round bottom heating block for 15 minutes. Next, a solution of basic dye (0.003-0.005 g) and de-ionized water (9.80 g) was added to the flask. The mixture was heated for 10 minutes at 46° C. before adding acetic acid (1 drop of 0.85 wt %). The mixture was further heated to 70° C. for 15 minutes, and then to 100-130° C. for 60 minutes, it took ~5-10 minutes to increase the heat. Next, the solution was removed leaving the fiber behind in the flask. The fiber was then washed with hot de-ionized water (~70° C.), and again with room temperature de-ionized water. To the flask was added a solution of MERPOL® HCS (0.061 g of a 0.1 wt % solution) and de-ionized water (50 g); then the flask was heated at 70° C. for 20 minutes. The fiber was then washed with hot de-ionized water (~70° C.) and room temperature de-ionized water sequentially. The fiber was wrapped in a Sontara® SPS™ towel to dry. Fibers were analyzed by cross-section. Images indicate distribution of each dye to the core of the fiber. (Fibers dyed at lower concentration of dye showed dye penetration to the core, but the absence of dye around the sheath; fibers dyed at higher concentrations of dye showed uniform dye penetration.)

Dye Test at Reduced Temperatures without the Carrier

In a 250-ml round bottom flask equipped with a reflux condenser was added POD-NDA yarn (30-50 mg) and a solution of MERPOL® HCS (1 drop of 0.1 wt % solution, ~0.03 g), benzyl alcohol (1.65 g), and de-ionized water (53.39 g). The mixture was heated on a 46° C. aluminum round bottom heating block for 15 minutes. Next, a solution of basic dye (0.003-0.005 g) and de-ionized water (9.80 g) was added to the flask. The mixture was heated for 10 minutes at 46° C. before adding acetic acid (1 drop of 0.85 wt %). The mixture was further heated to 70° C. for 15 minutes, and then to 25-100° C. for 60 minutes, it took ~5-10 minutes to increase the heat. Next, the solution was removed leaving the fiber behind in the flask. The fiber was then washed with hot de-ionized water (~70° C.), and again with room temperature de-ionized water. To the flask was added a solution of MERPOL® HCS (0.061 g of a 0.1 wt % solution) and de-ionized water (50 g); then the flask was heated at 70° C. for 20 minutes. The fiber was then washed with hot de-ionized water (~70° C.) and room temperature de-ionized water sequentially. The fiber was wrapped in a Sontara® SPS™ towel to dry. Fibers were analyzed by cross-section. Images indicate distribution of each dye to the core of the fiber. (Fibers dyed at lower concentration of dye showed dye penetration to the core, but the absence of dye around the sheath; fibers dyed at higher concentrations of dye showed uniform dye penetration.)

Fiber UV Stability

POD-NDA yarns were then separated into single filaments and mounted to a cardboard frame to provide full exposure to light. The cardboard frames were placed into a Xe arc chamber and the test was conducted for 96 hrs following AATCC 16E: Colorfastness to Light standardized test. Filaments were conditioned at 70 F & 60% humidity for 18 hrs.

Fiber Property Analysis

Denier was measured using the TEXTTECHNO Vibromat. Samples were cut into 9 cm segments and approximate denier were calculated by weight when appropriate (1 den=1 g/9000 m). This approximate denier was programmed into the Vibromat to determine the appropriate balance weight. Denier was determined by TEXTECHNO vibromat software and analysis was replicated 5-6 times.

The physical measurements were then determined using ASTM test D3822-07; to obtain the tenacity and elongation at break (max). Using ASTM test D3822-07, fibers were then analyzed for elongation at break (max) and tenacity using a 1 inch gauge length. Samples were analyzed using 0.1 or 0.6 in/min crosshead speed and a 500 g cell. Crosshead speed was determined by the % EB (<8-10% then 0.1 in/min was used, >10% then 0.6 in/min was used). Data was analyzed using Bluehill software and analysis was replicated 5-6 times.

The results are shown below

| Example | Denier | Denier After | Tenacity (gf/d) | Tenacity After (gf/d) | Elongation (%) | Elongation (%) After |
|---|---|---|---|---|---|---|
| [1] Nomex Bright | 1.6 | 1.7 | 3.5 | 1.2 | 43.7 | 7.7 |
| 1 | 2.8 | 2.7 | 3.4 | 1.6 | 14.8 | 5.1 |
| 2 | 2.1 | 2.3 | 2.8 | 1.04 | 17.3 | 3.7 |

[1] Comparative Example

What is claimed is:

1. A process for preparing a polymer, comprising the steps of:
    a) combining hydrazine, oleum, 2,6-naphthalene dicarboxylic acid, terephthalic acid and isophthalic acid, to form a reaction mixture, wherein
        i) the oleum is added in an amount of at least about 4 molar equivalents of $SO_3$ based on the number of moles of hydrazine,
        ii) the oleum is added in one step, and
        iii) the reaction mixture comprises about 1 molar % to about 50 molar % of 2,6-naphthalene dicarboxylic acid and about 50 molar % to about 99 molar of terephthalic acid and isophthalic acid, based on the total amount of 2,6-naphthalene dicarboxylic acid, terephthalic acid and isophthalic acid present; and
    b) heating the reaction mixture to a temperature of about 100° C. to about 180° C. until a polymer is prepared.

2. The process of claim 1 wherein the oleum is added in an amount of at least about 5 molar equivalents of $SO_3$ based on the number of moles of hydrazine.

3. The process of claim 1 wherein the heating is performed at about 120° C. to about 140° C. for at least about 0.5 hours.

4. The process of claim 1 wherein the reaction mixture comprises about 10 molar % to about 30 molar % of 2,6-naphthalene dicarboxylic acid and about 70 molar % to about 90 molar % of terephthalic acid and isophthalic acid, based on the total amount of 2,6-naphthalene dicarboxylic acid, terephthalic acid and isophthalic acid present.

5. The process of claim 1 wherein the polymer prepared is a sulfonated copolyoxadiazole polymer.

6. The process of claim 5 further comprising the step
    c) contacting the sulfonated copolyoxadiazole polymer with a neutralization agent.

* * * * *